US007615945B2

(12) United States Patent
Richmond et al.

(10) Patent No.: US 7,615,945 B2
(45) Date of Patent: Nov. 10, 2009

(54) BARRIER OPERATOR WITH PANIC CONTROL OVERRIDE MODE AND RELATED METHOD

(76) Inventors: Thomas R. Richmond, 2320 N. Park Blvd., Santa Ana, CA (US) 92706; Patrick S. Kochie, 5362 Moonshadow St., Simi Valley, CA (US) 93063; Donald A. Ouach, 1133 Azalea Dr., Alhambra, CA (US) 91801; Mario Sanchez, 14832 Dodger Ave., Hawthorne, CA (US) 90250

( * ) Notice: Subject to any disclaimer, the term of this patent is extended or adjusted under 35 U.S.C. 154(b) by 431 days.

(21) Appl. No.: 11/607,249

(22) Filed: Dec. 1, 2006

(65) Prior Publication Data

US 2008/0129233 A1 Jun. 5, 2008

(51) Int. Cl.
*H02P 23/14* (2006.01)
*E05F 15/00* (2006.01)

(52) U.S. Cl. ....................... 318/266; 318/264; 318/445; 318/466; 49/138

(58) Field of Classification Search ................. 318/264, 318/266, 375, 445, 457, 466; 49/340, 199, 49/138
See application file for complete search history.

(56) References Cited

U.S. PATENT DOCUMENTS

| | | | | |
|---|---|---|---|---|
| 4,007,557 | A | 2/1977 | Davis et al. | |
| 4,887,205 | A | 12/1989 | Chon | |
| 5,869,940 | A | 2/1999 | Parsadayan | |
| 5,942,867 | A | 8/1999 | Richmond | |
| 6,025,685 | A | 2/2000 | Parsadayan | |
| 6,092,338 | A | 7/2000 | Crowner et al. | |
| 6,484,784 | B1 | 11/2002 | Weik, III et al. | |
| 6,657,409 | B1 | 12/2003 | Leivenzon et al. | |
| 6,667,591 | B2 | 12/2003 | Mullet et al. | |
| 6,806,672 | B2 | 10/2004 | Fitzgibbon et al. | |
| 6,859,004 | B2 | 2/2005 | Hormann | |
| 7,034,487 | B1 * | 4/2006 | Murphy et al. | 318/466 |
| 7,042,183 | B2 | 5/2006 | Fitzgibbon et al. | |
| 7,180,260 | B2 * | 2/2007 | Murphy et al. | 318/466 |
| 7,207,142 | B2 * | 4/2007 | Mullet | 49/199 |
| 7,298,107 | B2 * | 11/2007 | McMahon | 318/466 |
| 2003/0057905 | A1 * | 3/2003 | Fitzgibbon | 318/375 |

(Continued)

FOREIGN PATENT DOCUMENTS

| | | |
|---|---|---|
| GB | 2 403 983 | 1/2005 |

(Continued)

*Primary Examiner*—Paul Ip
(74) *Attorney, Agent, or Firm*—J. Mark Holland & Assoc.

(57) ABSTRACT

In one embodiment, the present invention describes a gate closure system having a barrier or gate operator for moving a gate between a gate fully opened position and a gate fully closed position. The gate closure system preferably further includes, among other things, a master control board with input and output points to receive and transmit data associated with movement of the gate, including a panic control override mode circuit input to the master control board that negates all gate movement parameters during any portion of the gate's travel path to open or close the gate at a substantially greater rate of speed than typically used to open or close the gate during normal operation, regardless of the gate's speed, torque, direction of travel (forward or backward), or whether the gate is stationary.

12 Claims, 4 Drawing Sheets

U.S. PATENT DOCUMENTS

| | | | | |
|---|---|---|---|---|
| 2003/0076062 | A1 * | 4/2003 | Mullet et al. | 318/445 |
| 2003/0178962 | A1 * | 9/2003 | Fitzgibbon et al. | 318/466 |
| 2004/0145332 | A1 * | 7/2004 | Hom et al. | 318/457 |
| 2004/0177558 | A1 * | 9/2004 | Parsadayan et al. | 49/340 |
| 2007/0090781 | A1 * | 4/2007 | Keller et al. | 318/264 |

FOREIGN PATENT DOCUMENTS

| | | |
|---|---|---|
| JP | 3-152083 A | 6/1991 |

* cited by examiner

BARRIER OPERATOR WITH PANIC CONTROL OVERRIDE MODE AND RELATED METHOD

FIELD OF THE INVENTION

The present invention relates generally to a barrier operator, and more particularly, the present invention relates to a gate operator that preferably includes variable rate movement control modes and a panic control override mode circuit to open or close the barrier at a relatively greater rate than typically used to open or close the gate during normal operation for use in, among other things, doors, and windows, during, for example, emergency situations such as a terrorist attack or robbery.

BACKGROUND OF THE INVENTION

According to U.S. Pat. No. 5,942,867, issued Aug. 24, 1999 to Richmond, barrier or gate operators have become quite popular and are receiving widespread use, both for residential environments and business environments. Frequently, it is desirable to use a gate system for controlling access to a business office, an apartment building, or home. In order to provide either vehicle or pedestrian access, or both, gate operators are frequently employed and control the opening and closing movement of the gate.

Most gate operators usually employ a motor mechanism, such as an electrically or hydraulically powered motor along with one or more connecting arms which connect the motor to the gate in order to provide for an opening and closing driving movement.

As indicated in U.S. Pat. No. 5,869,940, issued Feb. 9, 1999 to Parsadayan, the gate may swing about a vertical hinge axis to open and close, or may move horizontally along a guide way. The Parsadayan patent describes a control system with a learning mode allowing a human to move the gate either manually or under powered operation with manual control, and during which the control system learns desired accelerations, decelerations, pauses, etc., along with start and finish positions for the gate movement in each direction of movement for the gate between opened and closed positions. Thereafter, during powered operation of the gate by the operator, the desired movement profile taught by a human to the operator during a learning mode experience is replicated. In the event that no preferred gate movement profile is available to the gate operator from a learning mode experience, it uses a default gate movement profile. Various default profiles of gate movement may be stored in memory and may be selected by an owner of the gate.

Other known control or barrier operators provide for (1) opening and closing movement of the gate in response to a signal and further provide a force in opposition to those movements to cushion the impact of the gate against any abutment at the fixed end positions (see the Richmond 867' patent); (2) starting and stopping the barrier at different speeds during travel along different parts of the path of travel such as when the gate encounters an obstruction in the path of the barrier (see U.S. Pat. No. 7,042,183, issued May 9, 2006 to Fitzgibbon et al.), and (3) a device for overcoming opening and closing speed variations in a gate due to mechanical design-related characteristics to achieve a defined and unchanging gate section speed, except during opening and closing (see U.S. Pat. No. 6,859,004, issued Feb. 22, 2005 to Hormann).

Accordingly, it is desirable to provide a barrier operator that preferably includes variable rate movement control modes and a panic control override mode to open or close the barrier at a relatively greater rate than typically used to open or close the gate during normal operation for use in, among other things, gates, doors, and windows.

SUMMARY OF THE INVENTION

For the purpose of summarizing the invention certain objects and advantages have been described herein. It is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

One embodiment of the gate closure system of the present invention includes a barrier or gate operator for moving a gate between a gate fully opened position and gate fully closed position. The gate closure system preferably further includes, among other things, a master control board having a central processing unit with input and output points to receive and transmit data associated with movement of the gate. The gate closure system of the present invention further includes a panic control override mode circuit with an input to the master control board.

The panic control override mode circuit input to the master control board negates all gate movement parameters during any portion of the gate's travel path to open or close the gate at a substantially greater rate of speed than typically used to open or close the gate during normal operation. In this regard, once the panic control override mode circuitry is activated, opening or closing of the gate will occur "unconditionally" at a substantially greater rate of speed than the speed used to open or close the gate during normal operation, regardless of the gate's speed, torque, direction of travel (forward or backward), or whether the gate is stationary.

These and other embodiments will become readily apparent to those skilled in the art from the following detailed description of the preferred embodiments having reference to the attached figures, the invention not being limited to any particular preferred embodiment(s) disclosed.

DETAILED DESCRIPTION

Figure 1:
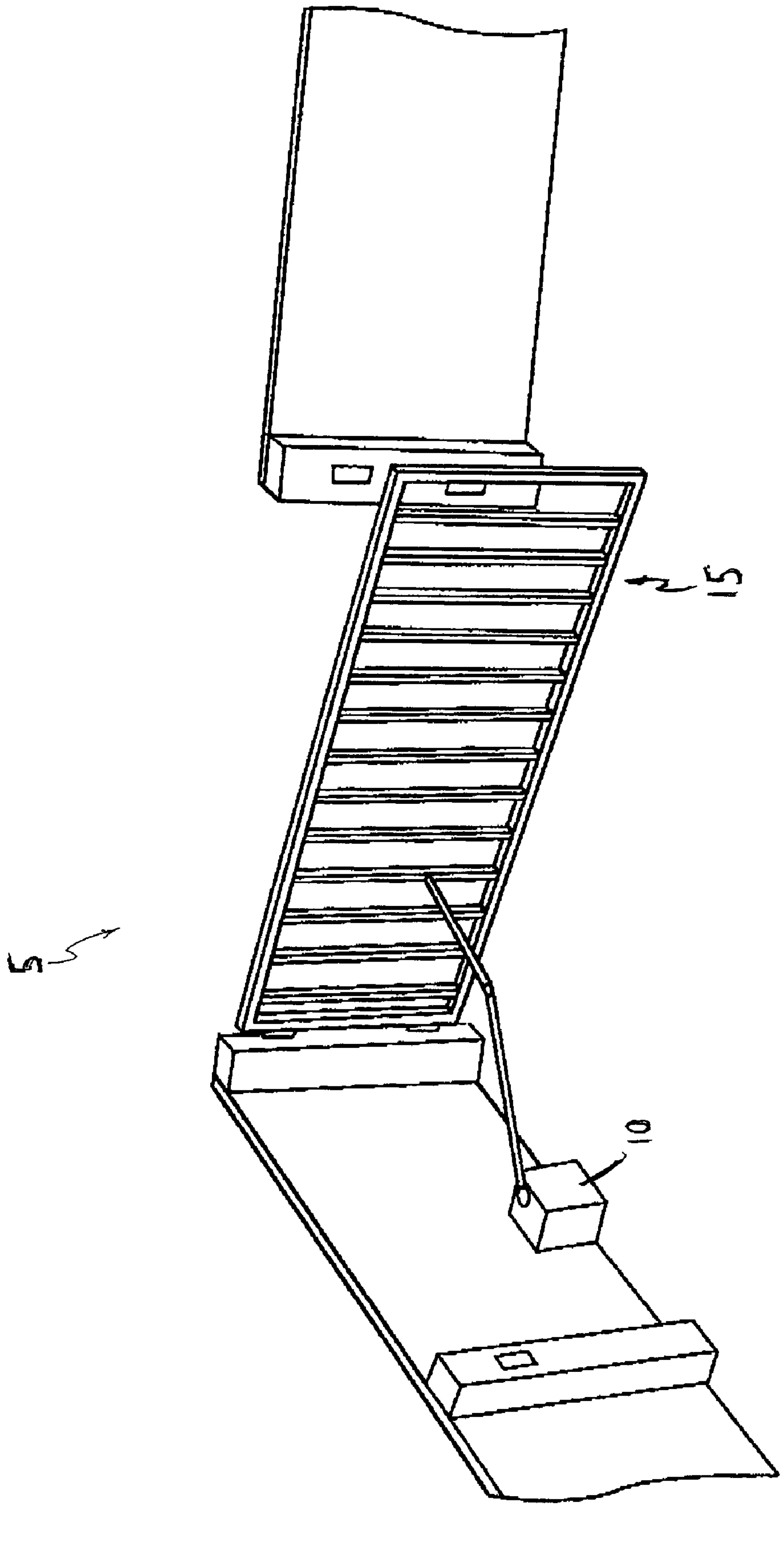
FIG. 1 shows a typical gate closure system including a barrier or gate operator for moving a gate between a gate fully opened position and a gate fully closed position.

Embodiments of the present invention will now be described with references to the accompanying Figures, wherein like reference numerals refer to like elements throughout. The terminology used in the description presented herein is not intended to be interpreted in any limited or restrictive manner, simply because it is being utilized in conjunction with a detailed description of certain embodiments of the invention. Furthermore, various embodiments of the invention (whether or not specifically described herein) may include novel features, no single one of which is solely responsible for its desirable attributes or which is essential to practicing the invention herein described.

Although the present invention is described herein as it pertains to a gate closure system 5, and more particularly to a gate control operator 10 that provides for variable rate closure modes and a panic control override mode for the "unconditional" opening or closing of a barrier 15 at a relatively greater rate than typically used to open or close the gate during normal operation, persons of ordinary skill in the art will understand that the invention may be applied or utilized in the control (opening and closing) of a door, window, blinds, or other barrier or closure device.

As shown in FIG. 1, one embodiment of the gate closure system 5 of the present invention includes a barrier or gate operator 10 for moving a gate 15 between a gate fully open position and a gate fully closed position. The structural and electrical connectivity of such a gate closure system 5 is described in U.S. Pat. No. 5,942,867, issued Aug. 24, 1999 to Richmond, the content of which is incorporated herein by reference in its entirety.

Figure 2:
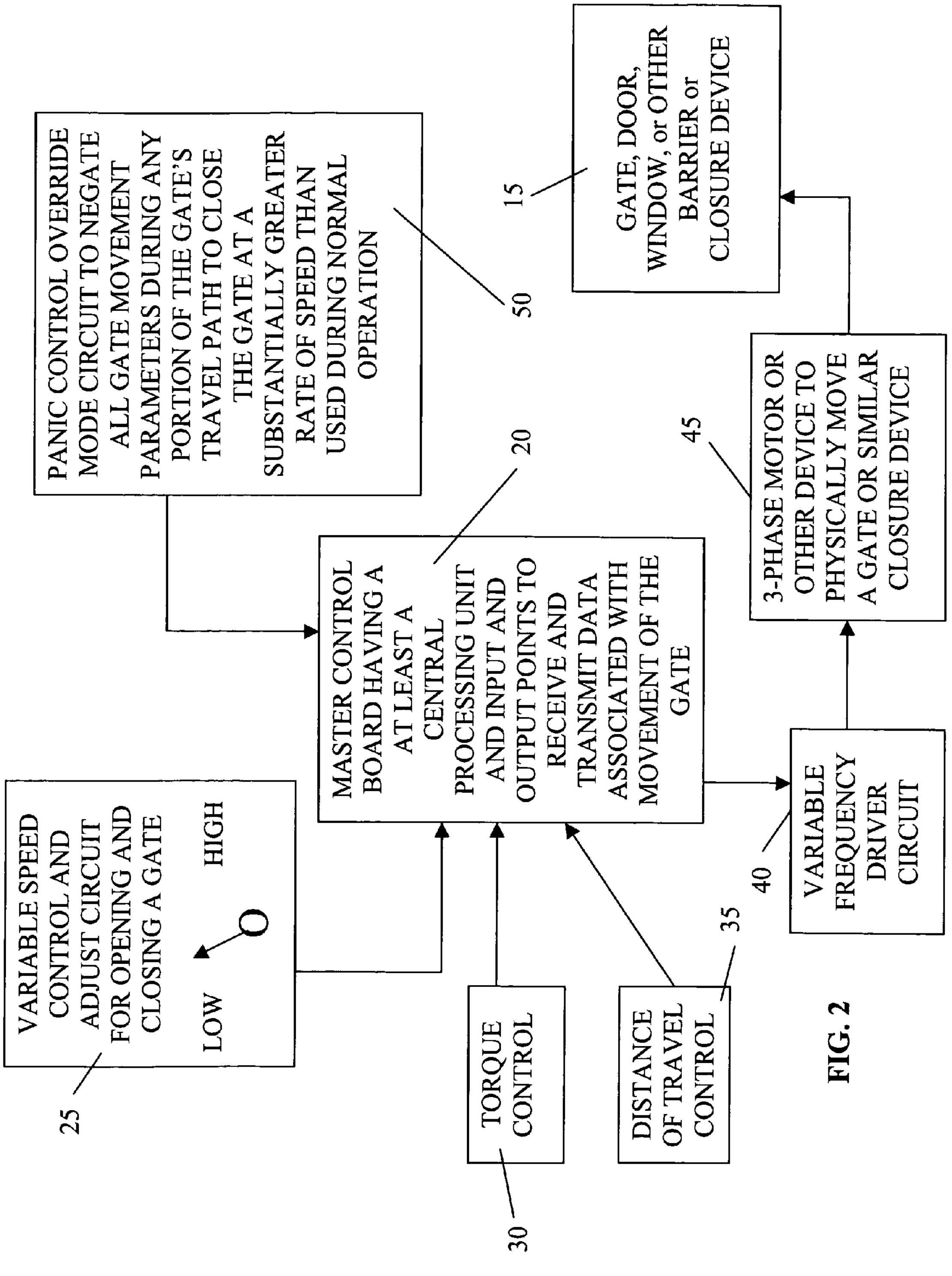
FIG. 2 shows a block diagram of one embodiment of the present invention having a panic control override mode circuit to open or close a gate at a substantially greater rate of speed than typically used to open or close the gate during normal operation of the gate.
Figure 3:
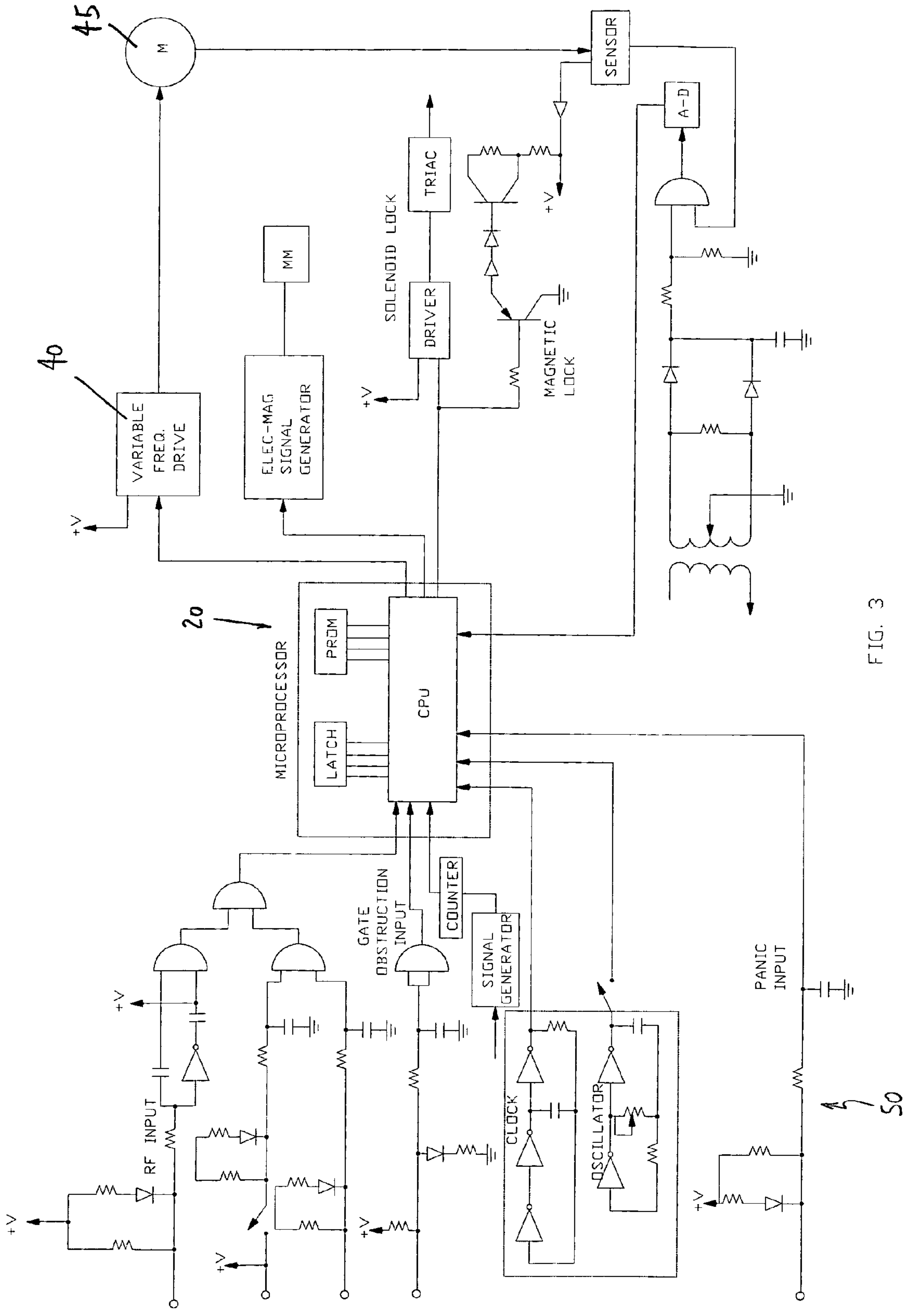
FIG. 3 is a schematic diagram of one embodiment of the present invention showing a panic control override mode circuit and its input to a master control board.

In this regard, the gate closure system 5 preferably further includes, among other things, a master control board 20 having a central processing unit with memory storage, and input and output points to receive and transmit data associated with movement of the gate 15. As shown in FIG. 2 and FIG. 3, input to the master control board 20 may include, among other things, single or variable gate speed control and/or adjust 25, and torque and distance of travel control and/or adjust 30, 35. Output from the master control board 20 may include, among other things, electrical signals to activate (energize) or deactivate (de-energize) a variable frequency drive circuit 40, and a motor assembly 45 or similar device to cause movement of the gate 15. The gate closure system 5 of the present invention further includes a panic control override mode circuit 50 with input to the master control board 20.

Panic control override mode circuit 50 input to the master control board 20 negates all gate movement parameters during any portion of the gate's travel path to open or close the gate 15 at a substantially greater rate of speed than is typically used to open or close the gate during normal operation. In other words, regardless of the gate's speed, torque, direction of movement (forward or backward), or whether the gate 15 is stationary at the time of the panic control override mode circuit 50 input to the master control board 20, the gate will open or close. In this regard, a typical gate 15 that controls access by persons desiring to passthrough the gate may have a rate of opening or closing of one-foot-per-second (1 foot/sec) during normal operation. Generally, this rate is capable of being adjusted to a greater or lesser degree depending on user preference. However, during an emergency situation, such as a terrorist attack, robbery, environmental disaster, etc., activation of the panic control override mode circuit 50 input to the master control board 20 will preferably cause the gate 15 to open or close at a rate of approximately six (6) to seven (7) feet/second. Persons of ordinary skill in the art will understand that the gate closure system 5 described herein could be configured such that the panic control override mode circuit 50 input to the master control board 20 causes the gate 15 to open or close, and that as long as the override mode rate of opening or closing is substantially greater than the rate of gate movement under normal operating conditions, the override mode rate may vary from that indicated above.

FIG. 3 shows the addition of the panic control override mode circuit 50 input to the central processing unit of a gate closure system, such as that shown in the Richmond '867 patent. Modification of the Richmond single speed gate closure system further requires replacement of the driver circuit with a variable frequency driver circuit 40 to provide the driving action necessary to energize the motor assembly 45 to move the gate 15 from a normal operating speed to a substantially greater rate of speed as would be required for panic control override mode 50 operation.

Figure 4:
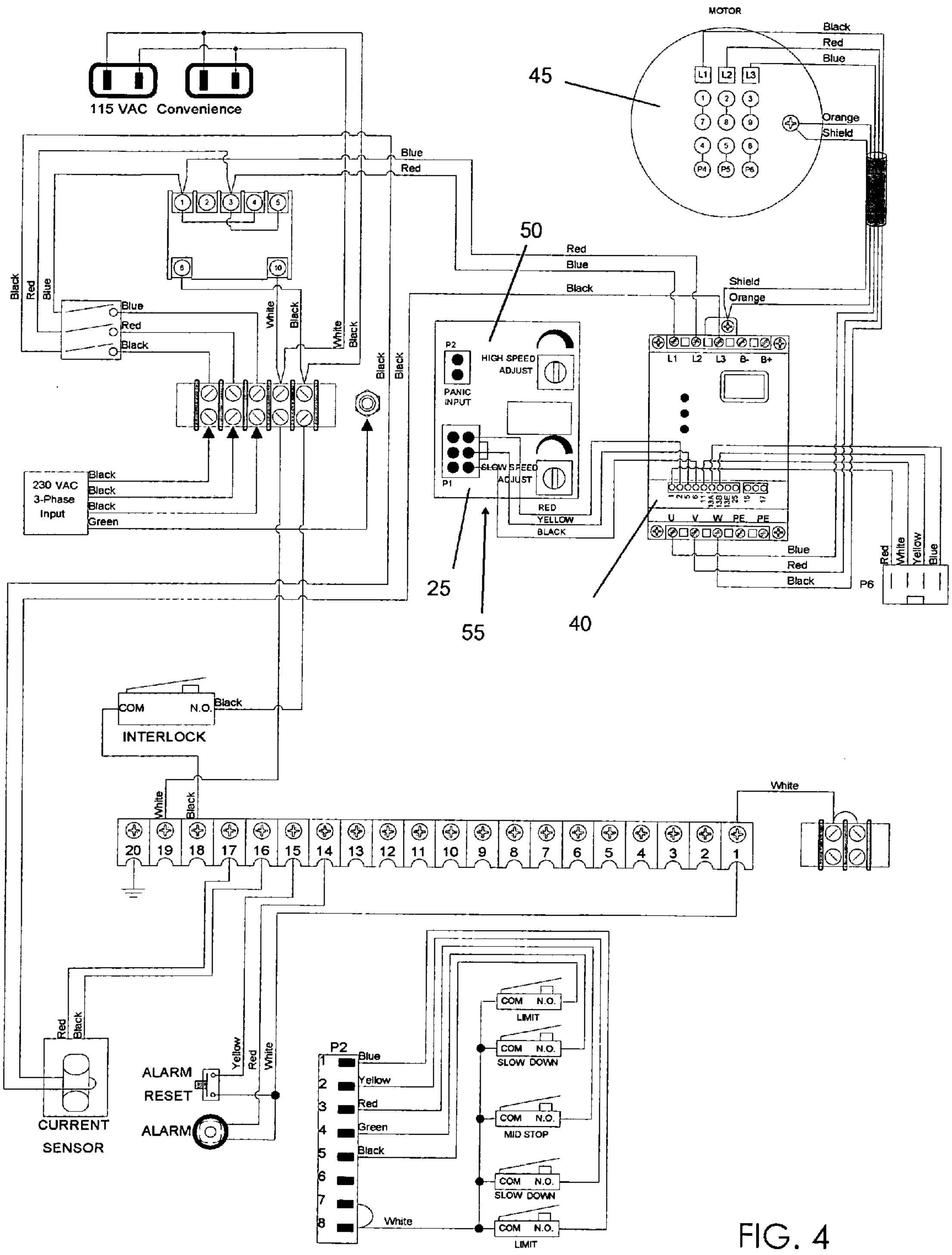
FIG. 4 shows a schematic of another embodiment of the present invention showing a gate control system's panic control override mode and variable speed control mode circuitry located on the same circuit board.

FIG. 4 shows a schematic diagram of one embodiment of the gate closure system 5 of the present invention with basic electrical connectivity of at least the panic control override mode circuit 50, variable frequency driver 40, and motor assembly 45. In contrast to FIG. 2, where the panic control override circuitry 50 and variable speed circuitry 25 are located on different circuit boards that may be physically remote from each other, the panic control override circuitry 50 and variable speed circuitry 25 of FIG. 4 are physically located on the same circuit board 55. In this regard, the variable speed control 25 permits opening and closing rate adjustment of the gate 15 under normal operating conditions, while the panic control override mode circuitry 50 permits input to the master control board 20 to negate all gate movement parameters during any portion of the gate's travel path to open or close the gate 15 at a substantially greater rate of speed than typically used to open or close the gate during normal operation. As indicated above, once the panic control override mode circuitry 50 is activated, opening or closing of the gate 15 will occur at a substantially greater rate of speed than the speed used to open or close the gate during normal operation regardless of the gate's speed, torque, direction of movement (forward or backward), or whether the gate 15 is stationary.

A method of effecting movement of a barrier or gate in accordance with the present invention, preferably includes the steps of: (1) energizing a rate control mode circuit during normal operation of the gate; (2) effecting movement of the gate in response to the step of energizing the rate control circuit; (3) overriding the movement of the gate during normal operation by including the step of energizing a panic control override mode circuit; and (4) effecting movement of the gate in response to the step of energizing the panic control override mode circuit at a rate substantially greater than the rate of gate movement during normal operation.

The apparatus and methods of the present invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

What is claimed is:

1. A barrier operator for moving a barrier, comprising:

a rate movement control mode circuit to effect movement of the barrier during normal operation; and a panic control override mode circuit to effect movement of the barrier at a relatively greater rate than during normal operation.

2. The apparatus of claim 1, wherein the rate of movement during normal operation is variable.

3. The apparatus of claim 1, wherein the barrier is a gate.

4. The apparatus of claim 1, wherein movement of the barrier effected by the panic control mode circuit is unconditional regardless of the barrier's rate of movement, torque, and direction of travel during normal operation, or whether the barrier is stationary.

5. The apparatus of claim 1, wherein the panic control override mode circuit effects movement in a direction to open or close the barrier.

6. A gate operator for moving a gate, comprising:

a master control board having a rate movement control input and a panic control override mode input;

wherein output from the master control board in response to the rate movement control input effects movement of the gate during normal operation, and output from the master control board in response to the input from the panic control override mode negates substantially all gate movement parameters during normal operation to effect movement of the gate at a relatively greater rate than during normal operation.

7. The apparatus of claim 6, wherein the rate of movement during normal operation is variable.

8. The apparatus of claim 6, wherein the gate movement parameters include rate of movement, torque, and direction of travel, or whether the gate is stationary.

9. The apparatus of claim 6, wherein the panic control override mode effects movement in a direction to open or close the gate.

10. A method of effecting movement of a gate, comprising the steps of:

energizing a rate control mode circuit during normal operation of the gate;

effecting movement of the gate in response to the step of energizing the rate control circuit;

overriding the movement of the gate during normal operation by including the step of energizing a panic control override mode circuit; and effecting movement of the gate in response to the step of energizing the panic control override mode circuit at a rate substantially greater than the rate of gate movement during normal operation.

11. The method of claim 10, further including the step of providing a variable rate control to effect movement of the gate during normal operation.

12. The method of claim 10, wherein the step of effecting movement of the gate in response to the step of energizing the panic control override mode circuit further includes the step of moving the gate in an open or close direction.

* * * * *